United States Patent Office 3,095,065
Patented June 25, 1963

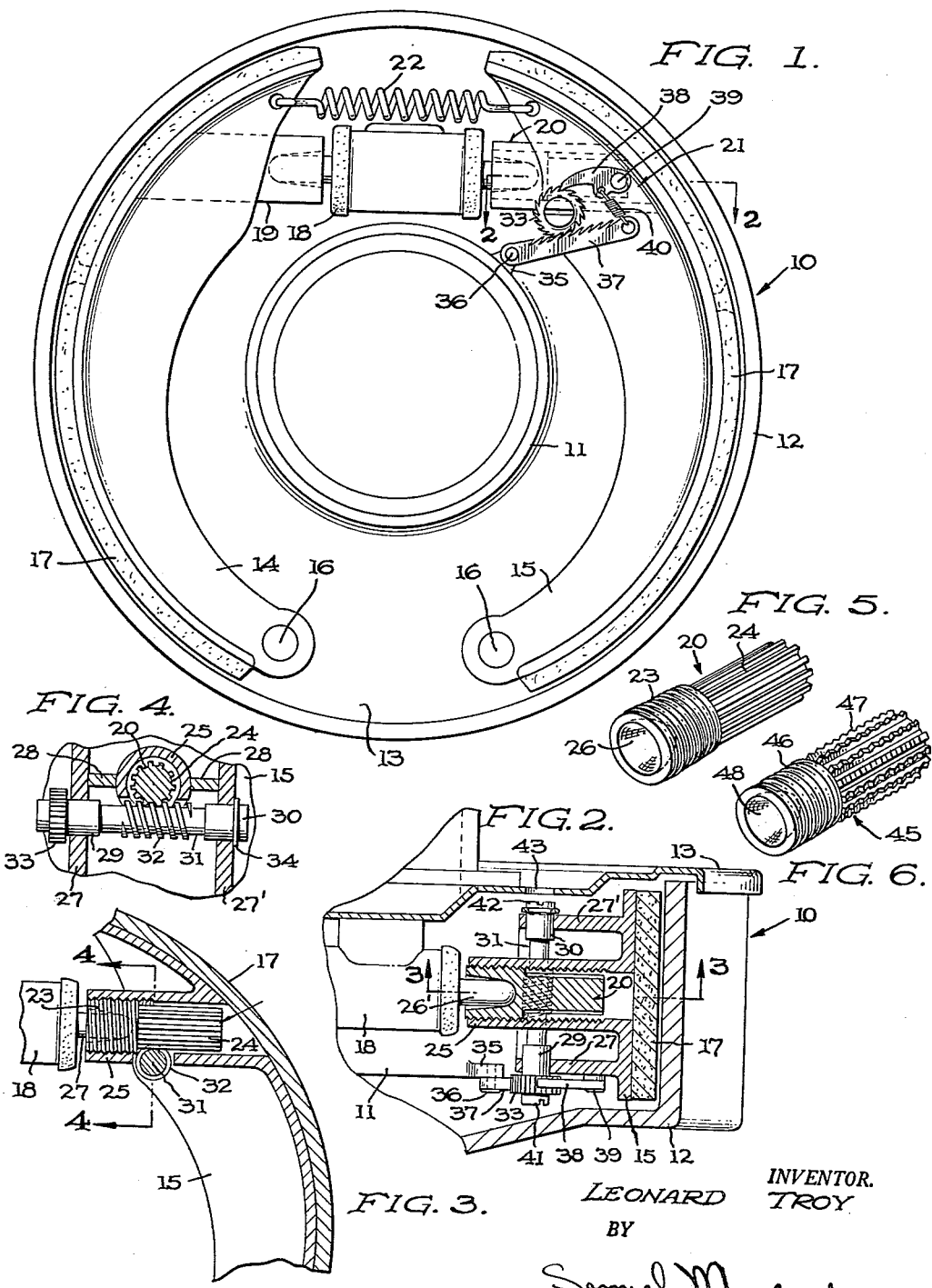

3,095,065
BRAKE SHOE ADJUSTMENT MECHANISM
Leonard Troy, 5 Pen-Y-Bryn Drive, Scranton, Pa.
Filed Dec. 11, 1961, Ser. No. 158,219
8 Claims. (Cl. 188—79.5)

This invention relates in general to new and useful improvements in vehicle brake construction, and more particularly to a novel brake shoe adjuster and means for automatically compensating for the wear of brake shoe linings.

In the operation of motor vehicles, each time the brakes of the vehicle are applied, a minute portion of the linings carried by the brake shoes is worn. As a result, the brakes of a motor vehicle require periodic adjustments so that the linings of each brake shoe, when they are applied to the brake drums associated therewith, are concentric with the brake drum. This invention provides for the automatic adjustment of the brake shoes during the use of the brakes rather than requiring periodic stops for manual adjustment, although manual adjustment may be made if desired.

A primary object of this invention is to provide an automatic brake adjuster which includes a pressure receiving fitting which is engaged by an actuator for the brake and which fitting is adjustably carried by an associated brake shoe and has means associated therewith for automatically adjusting the same with respect to the brake shoe during the use of the brakes.

Another object of this invention is to provide a novel vehicle wheel brake which includes the usual brake shoes and an actuator for moving the brake shoes outwardly into engagement with an associated brake drum, at least one of the brake shoes being provided with a pressure receiving fitting which is adjustably threadedly engaged therein, and there being provided means for rotating the fitting during the use of the brake to effect the automatic adjustment of the positions of the brake shoes relative to the brake drum.

A further object of this invention is to provide a novel brake shoe adjuster in the form of a thrust receiving fitting threadedly engaged in the associated brake shoe for adjustment relative thereto, the fitting being provided with elongated teeth or splines in addition to a threaded portion engaged with the brake shoe, and there being carried by the brake shoe a shaft disposed normal to the axis of the fitting and having a worm engaged with the splines of the fitting, the brake adjuster also including means for automatically rotating the shaft after a predetermined movement of a brake shoe during the return stroke of the brake shoe to thereby effect the rotation of the fitting and the adjustment thereof relative to the brake shoe.

A still further object of this invention is to provide an automatic brake shoe adjuster which includes a threaded opening in the end of the brake shoe normally opposing the actuator for the brake shoe, a fitting threadedly engaged in the opening for engagement with the brake shoe actuator, the fitting having a threaded portion engaging the brake shoe and a splined tooth portion out of engagement with the brake shoe and in engagement with a worm gear carried by a shaft which is driven in response to movement of the brake shoe, the shaft being further provided with a slotted end wherein the shaft may be manually adjusted when desired.

Yet another object of this invention is to provide a novel brake shoe adjuster in the form of a thrust receiving fitting which is threadedly engaged in an associated brake shoe for adjustment relative thereto, the fitting being provided with elongated teeth or splines which extend a major portion of the length of the fitting and which, if desired, may extend the full length of the fitting, and the fitting, in addition to the provision of the splines, being threaded the full length thereof whereby a maximum adjustment of the fitting with respect to the brake shoe may be obtained, and there being carried by the brake shoe a shaft disposed normal to the axis of the fitting and having a worm engaged with the splines of the fitting whereby when the worm is rotated, the fitting will be rotated with respect to the brake shoe so as to adjust the fitting relative to the brake shoe and thereby adjust the brake shoe.

With the above and other objects in view that will hereinafter appear, the nature of the invention will be more clearly understood by reference to the following detailed description, the appended claims and the several views illustrated in the accompanying drawings.

In the drawings:

FIGURE 1 is an elevational view showing a brake assembly in accordance with this invention.

FIGURE 2 is a fragmentary horizontal sectional view taken along the line 2—2 of FIGURE 1, and shows the specific details of the brake adjuster carried by one of the brake shoes.

FIGURE 3 is a fragmentary vertical sectional view taken along the line 3—3 of FIGURE 2, and shows further the details of the brake adjuster.

FIGURE 4 is a fragmentary vertical sectional view taken along the line 4—4 of FIGURE 3, and shows the specific connection between the operating shaft and the fitting of the brake adjuster.

FIGURE 5 is an enlarged perspective view showing the specific details of the fitting.

FIGURE 6 is a perspective view similar to FIGURE 5 and shows a modified form of fitting.

Referring now to the drawings in detail, it will be seen that there is illustrated in FIGURE 1 a vehicle wheel brake assembly generally referred to by the numeral 10. The vehicle wheel brake assembly 10 is carried by a wheel support 11, which in the illustrated example is in the form of a large journal for receiving the hub portion of a brake drum 12. The illustrated brake assembly 10 includes the usual backing plate 13, which is carried by the wheel support 11, and a pair of brake shoes 14 and 15 which are pivotally mounted on the backing plate 13 by means of suitable pivot pins 16.

Each of the brake shoes 14 and 15 is provided with a lining 17 which is suitably secured thereto and which is engaged with the brake drum 12 during the actuation of the vehicle wheel brake assembly 10. When the vehicle wheel brake assembly 10 is of the hydraulic actuated type, the brake shoes 14 and 15 are urged apart remote from the pivot pins 16 by means of a wheel cylinder 18 of the conventional type, the wheel cylinder 18 being centrally located and supported by the backing plate 13. The brake shoe 14 carries a fixed thrust receiving fitting 19 engaged by the wheel cylinder 18, and the brake shoe 15 carries a special thrust receiving fitting 20 which is engaged by the opposite end of the wheel cylinder 18, the thrust receiving fitting 20 being a component of the brake adjuster, which is the subject of this invention, the brake adjuster being generally referred to by the numeral 21. The upper portions of the brake shoes 14 and 15 are connected together by a return spring 22 which pulls the brake shoes 14 and 15 away from the brake drum 12 when the wheel cylinder 18 is not in its extended position.

It will be readily apparent that in the use of the vehicle wheel brake assembly 10, the linings 17 will wear due to their frictional contact with the rotating drum 12. As the linings 17 wear, they become further spaced from the drum 12 and must be periodically adjusted to take up the slack due to the wear. In accordance with this invention, an automatic brake adjuster, described above and referred to by the numeral 21, is provided.

As is described above, the brake shoe 15 is provided with a thrust receiving fitting 20. The thrust receiving fitting 20, as is shown in FIGURE 5, includes an enlarged threaded end 23 and a longitudinally splined toothed portion 24 which is of a lesser diameter. The threaded portion 23 is threadedly engaged in an internally threaded sleeve portion 25 of the brake shoe 15, as is best shown in FIGURE 2. The enlarged threaded end 23 is provided with an end socket 26 which receives a plunger 26' of the wheel cylinder 18, as is also best shown in FIGURE 2. It will be apparent that when the fitting 20 is rotated within the sleeve 25, it will be longitudinally adjusted with respect to the brake shoe 15 and in effect provide for an extension of the plunger 26' which is required to effect the adjustment of the brake shoes 14 and 15.

The brake shoe 15 is reinforced by a pair of ribs 27 and 27'. The internally threaded sleeve portion 25 is disposed between the ribs 27 and 27' and is connected thereto by means of a transverse rib 28, as is best shown in FIGURE 4. The ribs 27 and 27' have received therein enlarged portions 29 and 30, respectively, of a shaft 31. The shaft 31 has a central worm 32 which is meshed with the splines or teeth 24 on the fitting 20, as is best shown in FIGURE 4. It will thus be apparent that when the shaft 31 is rotated, the fitting 20 will be driven by the worm 32 and rotated within the sleeve 25 to effect the desired adjustment of the fitting 20 with respect to the brake shoe 15.

The shaft 31 is provided with a toothed portion 33 adjacent the enlargement 29 so as to restrict movement of the shaft 31 to the right, as viewed in FIGURE 4. Movement of the shaft 31 to the left in FIGURE 4 is prevented by a removable ring 34 carried by the enlargement 30.

The wheel support 11 has an ear 35 carrying a pivot pin 36 which, in turn, supports a rack 37. The rack 37 is engaged with the toothed portion 33 of the shaft 31 and the teeth of the toothed portion 33 and the rack 37 are so faced as to effect rotation of the shaft 31 when the brake shoe 15 is being returned to its normal position by the action of the spring 22.

In order to prevent the accidental rotation of the shaft 31 rearwardly from an adjusted position, a dog 38 is pivotally mounted on the web 27 by means of a pivot pin 39. The dog 38 is engaged with the toothed portion 32 of the shaft 31 in the manner best illustrated in FIGURE 1. Although the dog 38 is desirable for the purpose of preventing the reverse accidental rotation of the shaft 31, it is to be understood that the dog 38 is optional and, if desired, may be omitted.

A spring 40 extends between the rack 37 and the dog 38. This spring serves to constantly hold the dog 38 and the rack 37 in engagement with the toothed portions 33 of the shaft 31 and thus provides the control of the positions and rotation of the shaft 31 at all times. It will be apparent that when the toothed portion 33 is riding over the rack 37, it will be desired that the dog 38 be more firmly engaged. By coupling the rack 37 and the dog 38 by the spring 40, this will be automatically accomplished. Although it is preferred that a single spring, such as the spring 40, be utilized to hold both the rack 37 and the dog 38 in position, it is to be understood that if it is otherwise desirable, separate springs may be utilized in lieu of the single spring 40.

The shaft 31 may also be manually adjusted. To this end, the end of the shaft 31 adjacent the toothed portion 33 is provided with a screwdriver receiving slot 41. A similar screwdriver receiving slot 42 is formed in the opposite end of the shaft 31. Also, the backing plate 13 is provided with an opening 43 through which the shaft 31 may be manually rotated to effect the manual adjustment of the brake shoes 14 and 15.

One of the primary features of the brake adjuster 21 is the construction of the fitting 20 wherein the fitting 20 is of a one-piece construction which may be readily cast or otherwise formed at a minimum expense and which may be installed within a brake by the mere addition of a sleeve portion to the brake shoe, the sleeve portion being of the nature wherein it can be initially formed as part of the brake shoe or may be separately welded thereto in the case of prior brake shoe constructions.

During the operation of the brake actuator 21, it will be seen that the shaft 31 remains stationary when the brake shoe 15 moves outwardly into engagement with the brake drum 12. Normally when the brake shoe 15 is returned to its innermost position by the spring 22, no rotation of the shaft 31 will take place. It is necessary that the toothed portion 33 slide on the rack 37 a full tooth during the actuation of the wheel brake assembly 10. Then, upon the return movement of the brake shoe 15, the engagement of the new tooth of the toothed portion 33 with the associated tooth of the rack 37 will result in the rotation of the shaft 31 and the resultant driving of the fitting 20 to effect the adjustment thereof. It will be understood that the pitch of the threads 23 and the drive ratio of the splined or threaded portion 24 with respect to the worm 32 will be such that the fitting 20 is advanced an amount equal to that wear of the linings 17 which is necessary to effect the rotation of the shaft 31.

Although the fitting 20 has been illustrated as having straight splines 24, it is to be understood that the splines 24, if desired, may be helical. Of course, the worm 32 would then be designed accordingly.

Reference is now made to FIGURE 6 wherein still another form of fitting, generally referred to by the numeral 45, is illustrated. The fitting 45 is provided with a threaded end 46 which corresponds to the end 23 of the fitting 20. The remainder of the fitting 45 is provided with splines 47, which splines 47 correspond to the splines 24 of the fitting 20. However, unlike the fitting 20, the fitting 45 is of a constant diameter. In addition, in lieu of the splines 47 being uninterrupted, the splines 47 are provided with continuations of the threads 46. In this manner, the fitting 45 has provisions for a much greater adjustment than does the fitting 20. The fact that the threads 46 continue onto the splines 47 will in no way effect the engagement of the worm 32 with the splines 47.

It is to be noted that the fitting 45 is provided with a socket 48 which corresponds to the socket 26 of the fitting 20. It is also to be understood that the splines 47 may be helical, if so desired, although they have been illustrated as being straight.

In the illustrated form of the invention, the brake shoes 14 and 15, as well as the wheel cylinder 18, have been illustrated and described as being mounted on a backing plate 13. However, in certain types of brake construction, backing plates are not utilized. In such event, other suitable support means will be provided for mounting the brake shoes 14 and 15 and the wheel cylinder 18 on the wheel support 11.

It is also pointed out that while the invention has been illustrated with only the brake shoe 15 as carrying the brake adjuster 21, it is to be understood that the brake shoe 14 may be provided with a similar brake adjuster. In other words, each brake shoe of a brake may be provided with a brake adjuster formed in accordance with this invention.

It is further pointed out that the automatic brake wear compensating means of the brake adjuster need not always be incorporated in the brake adjuster. The simplicity of the present brake adjuster is a highly desirable feature, and this brake adjuster may be used with or without the automatic wear compensating means.

It is to be understood that although this invention has been illustrated with respect to a vehicle wheel brake assembly of the hydraulically actuated type, it may also be equally as well applied to other types of brake actuation, and minor modifications may be made in the invention within the spirit and scope of the invention, as defined in the appended claims.

I claim:
1. In a vehicle wheel brake, an elongated brake shoe having a braking surface and an integral internally threaded socket extending from adjacent one end of said shoe and opening opposite said braking surface, a pressure receiving fitting for said brake shoe adjustably threaded in said socket, and adjusting means journaled on said brake shoe directly engaging said fitting for rotating and extendibly adjusting said fitting in response to actuation of the wheel brake.

2. In a vehicle wheel brake, an elongated brake shoe having a braking surface and an integral internally threaded socket extending from adjacent one end of said shoe and opening opposite said braking surface, a pressure receiving fitting for said brake shoe adjustably threaded in said socket, and adjusting means journaled on said brake shoe directly engaging said fitting for rotating and extendibly adjusting said fitting in response to actuation of the wheel brake, said adjusting means including a shaft having a gear extending into said socket, and teeth on said fitting engaged by said gear to rotate said fitting in response to rotation of said shaft.

3. In a vehicle wheel brake, an elongated brake shoe having a braking surface and an integral internally threaded socket extending from adjacent one end of said shoe and opening opposite said braking surface, a pressure receiving fitting for said brake shoe adjustably threaded in said socket, and adjusting means journaled on said brake shoe directly engaging said fitting for rotating and extendibly adjusting said fitting in response to actuation of the wheel brake, said adjusting means including a shaft having a worm extending into said socket and said fitting having integral elongated teeth thereon engaged by said worm to rotate said fitting in response to rotation of said shaft, said shaft having a toothed portion, and a rack engaged with said toothed portion, said rack having one end pivotally mounted on said brake remote from said shoe, and the teeth of said toothed portion facing towards said rack fixed end whereby the relative movement of said brake shoe with respect to said rack during the normal operation of said vehicle wheel brake will result in rotation of said shaft during the return movement of said brake shoe when the lining is worn a predetermined amount.

4. The vehicle wheel brake of claim 3 wherein a dog is pivotally mounted on said shoe and engaged with said toothed portion for preventing the counter rotation of said shaft during the initial movement of said brake shoe.

5. The vehicle wheel brake of claim 3 wherein a dog is pivotally mounted on said shoe and engaged with said toothed portion for preventing the counter rotation of said shaft during the initial movement of said brake shoe, and a single spring extending between said dog and said rack and displaceably retaining said dog and said rack in engagement with said toothed portion.

6. The vehicle wheel brake of claim 3 wherein at least one end of said shaft has a tool receiving shape for effecting the manual adjustment of said shaft, said brake comprising a mounting plate closing one side thereof and including an aperture therethrough, said aperture being in alignment with said tool receiving shape of said shaft for permitting rotation of said shaft exteriorly of said brake.

7. The structure of claim 2, said fitting having integral longitudinally extending elongated teeth thereon engaged by said worm to rotate said fitting in response to rotation of said shaft, said elongated teeth being provided with engageable threads in said socket.

8. The vehicle brake of claim 1 wherein said adjusting means includes a shaft disposed substantially parallel to said braking surface, at least one end of said shaft including a tool receiving shape for effecting manual adjustment of said shaft, said brake including a mounting plate at one side thereof and having an aperture in alignment with said tool receiving shape for effecting manual adjustment of said shaft from the exterior of said mounting plate.

References Cited in the file of this patent

UNITED STATES PATENTS

| | | |
|---|---|---|
| 2,049,628 | Rowland et al. | Aug. 4, 1936 |
| 2,173,028 | Vincent | Sept. 12, 1939 |
| 2,287,238 | Goepfrich | June 23, 1942 |
| 2,493,177 | Williams | Jan. 3, 1950 |

FOREIGN PATENTS

| | | |
|---|---|---|
| 634,408 | Great Britain | Mar. 22, 1950 |